United States Patent
Murakawa et al.

(10) Patent No.: US 7,533,356 B2
(45) Date of Patent: May 12, 2009

(54) PARAMETER ADJUSTING DEVICE AND PARAMETER ADJUSTING MEANS

(75) Inventors: Masahiro Murakawa, Tokyo (JP); Keiichi Ito, Tokyo (JP); Michiko Miura, Higashi-Hiroshima (JP)

(73) Assignee: Evolvable Systems Research Institute Inc., Tokyo (JP)

( * ) Notice: Subject to any disclaimer, the term of this patent is extended or adjusted under 35 U.S.C. 154(b) by 206 days.

(21) Appl. No.: 10/594,842

(22) PCT Filed: Mar. 29, 2005

(86) PCT No.: PCT/JP2005/005846

§ 371 (c)(1),
(2), (4) Date: Sep. 28, 2006

(87) PCT Pub. No.: WO2005/096386

PCT Pub. Date: Oct. 13, 2005

(65) Prior Publication Data

US 2007/0198103 A1    Aug. 23, 2007

(30) Foreign Application Priority Data

Mar. 31, 2004    (JP)    ............................. 2004-105631

(51) Int. Cl.
*G06F 17/50* (2006.01)
*G06N 3/00* (2006.01)
(52) U.S. Cl. .................... 716/4; 716/2; 703/13; 706/13
(58) Field of Classification Search ........................ None
See application file for complete search history.

(56) References Cited

U.S. PATENT DOCUMENTS 6,269,277 B1 * 7/2001 Hershenson et al. .......... 700/97

(Continued)

FOREIGN PATENT DOCUMENTS

JP    2003-108972    4/2003

(Continued)

OTHER PUBLICATIONS

Chen, Cheng-Kai, "A Genetic Algorithm for Deep-Submicron MOSFET Parameters Extraction and Simulation," Master's Thesis, Chiao Tung University, Jul. 2002, 119 pages.*
Coello, Carlos A., "An Updated Survey of GA-Based Multiobjective Optimization Techniques," ACM Computing Surveys, vol. 32, No. 2, Jun. 2000, pp. 109-143.*

(Continued)

*Primary Examiner*—Leigh Marie Garbowski
(74) *Attorney, Agent, or Firm*—Manabu Kanesaka (57) ABSTRACT

A parameter adjusting device and a parameter adjusting method configured to adjust a great number of parameters used for a circuit design model of a semiconductor element such as a transistor within a short time. A parameter adjusting device adapts a circuit design model wherein a formula for analysis is derived based on a surface potential such as, for example, the HiSIM, as the circuit design model of a semiconductor element; defines a chromosome wherein a respective great number of parameters of the model are genes; and optimizes the parameter based on property measured data of a tested element, using a genetic algorithm. Parameter adjustment comprises a first step adjusting the parameters which determine the structure of the semiconductor element based on the property measured data of a long channel group; and a second step adjusting nonadjusted parameters based on the property measured data of various lengths of channels with reference to a result of the first step. Adjustment of the optimum parameters within a short time and with a high degree of accuracy, which was conventionally difficult, can be performed.

5 Claims, 9 Drawing Sheets

U.S. PATENT DOCUMENTS 6,314,390 B1 * 11/2001 Bittner et al. .................. 703/14
6,400,993 B1 * 6/2002 Oberg .......................... 700/33
6,637,008 B1 * 10/2003 Higuchi et al. ................. 716/2

FOREIGN PATENT DOCUMENTS

| | | |
|---|---|---|
| JP | 2003-248810 | 8/2003 |
| JP | 2005-038216 | 2/2005 |

OTHER PUBLICATIONS

Keser, Milan and Joardar, Kuntal, "Genetic Algorithm Based MOSFET Model Parameter Extraction," Technical Proceedings of the 2000 Int'l Conference on Modeling and Simulation of Microsystems, pp. 314-344.*

* cited by examiner

| Technological Parameters | | |
|---|---|---|
| TOX | oxide thickness | m |
| XLD | gate-overlap length | m |
| XWD | gate-overlap width | m |
| XPOLYD | difference between gate-poly and design lengths | m |
| TPOLY | height of the gate poly-Si | m |
| RS | source-contact resistance | VA-1m |
| RD | drain-contact resistance | VA-1m |
| ●NSUBC | substrate-impurity concentration | cm-3 |
| ●NSUBP | maximum pocket concentration | cm-3 |
| ●VFBC | flat-band voltage | V |
| LP | pocket penetration length | m |
| XQY | distance from drain junction to maximum electric field point | m |

FIG. 10

| Mobility | | |
|---|---|---|
| VDS0 | drain voltage for extracting the low-field mobility | V |
| ●MUECB0 | Coulomb scattering | cm2V-1s-1 |
| ●MUECB1 | Coulomb scattering | cm2V-1s-1 |
| MUEPH0 | phonon scattering | cm2(Vs)-1(V cm-1)MUEPH1 |
| ●MUEPH1 | phonon scattering | — |
| MUETMP | temperature dependence of phonon scattering | — |
| MUESR0 | surface-roughness scattering | cm2(V s)-1(V cm-1)MUESR1 |
| ●MUESR1 | surface-roughness scattering | — |
| NDEP | coeffcient of effective-electric field | — |
| NINV | coeffcient of effective-electric field | — |
| NINVD | modification of NINV | V-1 |
| BB | high-field-mobility degradation | — |
| ●VMAX | maximum saturation velocity | cm s-1 |
| VOVER | velocity overshoot effect | cmVOVERP |
| VOVERP | L$_{gate}$ dependence of velocity overshoot | — |
| RPOCK1 | resistance coefficient caused by the potential barrier | V2A-RPOCP1μm1-RPOCP2 |
| RPOCK2 | resistance coefficient caused by the potential barrier | V |
| RPOCP1 | resistance coefficient caused by the potential barrier | — |
| RPOCP2 | resistance coefficient caused by the potential barrier | — |

PARAMETER ADJUSTING DEVICE AND PARAMETER ADJUSTING MEANS

FIELD OF THE INVENTION

The present invention relates to a parameter adjusting device and parameter adjusting means, especially, a parameter adjusting device and parameter adjusting means that can adjust a great number of parameters used for the circuit design model of a semiconductor element such as a transistor, within a short time.

BACKGROUND OF THE ART

In the case of LSI manufacturing, first, samples of several transistors (MOSFET) with a different shape (size) of a channel length L, channel width W, and so on of a gate of the transistor (MOSFET or an element similar to the MOSFET) are tested in the manufacturing line. Next, from the measurement result of an electric property of a tested piece, a great number of model parameters of the circuit (and element) design model of the transistor are adjusted (fitted) so as to conform with the transistor property which is manufactured in the manufacturing line with a high degree of accuracy. Simulation of various types of LSI (transistor) which are manufactured in the manufacturing line by the heretofore known circuit simulator such as SPICE was carried out by using the circuit design model of the transistor.

Taking the MOSFET which is used the most in the world as an example, several models are proposed as the circuit design model of the transistor. Conventionally, the heretofore known BSIM (Berkeley Short Channel IGFET Model) is mainly used for the above-mentioned simulation. The BSIM expresses a relationship among a Vg (gate voltage), Vd (drain voltage), Vb (bulk voltage), and Id (drain current) and so on by a great number of formulas including a variable such as the channel length L, channel width W, and so on of the gate, and a great number of parameters. However, the BSIM consists of a large number of formulas, and the number of basic parameters alone which should be adjusted has more than 50 parameters, so that adjustment of the parameters was difficult. Also, if a field without actual measurement value is extrapolated and simulated, the chance of an error increases.

Consequently, a new type of circuit design model named HiSIM (Hiroshima-university STARC IGFET Model) which is a surface potential model wherein a formula for analysis is derived based on surface potential, has been recently developed and disclosed by Miura, one of the inventors of the present invention. The HiSIM wherein the transistor property is described by using the surface potential has a small number of parameters compared to the conventional BSIM which is indicated as a function of an external voltage, and even if the HiSIM is extrapolated, a high-accuracy simulation can be performed. Incidentally, since details of the HiSIM and conventional parameter adjusting means in the HiSIM are described in the following publication available for downloading from the following URL, detailed explanations are omitted.

Japanese Nonpatent Publication 1: HiSIM 1.1.1 User's Manual

Also, conventionally, a parameter adjusting device that automatically performs the parameter fitting (adjusting) processing of a physical model including a great number of parameters using a genetic algorithm from an experimental result and so on, is proposed. For example, in the following publication previously submitted for a patent by the inventors of the present invention, a commonly-used parameter adjusting device that automatically performs the parameter adjusting processing of a physical model including a great number of parameters using the genetic algorithm, is proposed.

Japanese Patent Publication 1: Japanese Patent Publication No. 2003-108972

DISCLOSURE OF INVENTION

Problems to be Resolved by the Invention

In the model based on a surface potential such as the HiSIM, the weight of individual parameters is large, so that if any of the parameters converges on an incorrect value, all the parameter values lose credibility. Therefore, in the conventional parameter adjusting means, it is dangerous to optimize a great number of parameters at the same time, so that only a part of the parameters is optimized at first and fastened, and then another part of the parameters is optimized. By repeating the above-described actions, entire parameters are adjusted. However, although the HiSIM has fewer parameters than the BSIM has, the transistor property is described by an electric charge calculated using the surface potential, and an optimum parameter cannot converge through the above-described means, depending on the order of the processing of an optimized parameter, or a lot of time and labor are required in order to converge on the optimum parameter.

Means of Solving the Problems

The present invention is made in order to solve the above-mentioned problems, and the main feature of the parameter adjusting device of the invention is that, a parameter adjusting means is provided, and the parameter adjusting means adopts a surface potential model wherein a formula for analysis is derived based on surface potential such as, for example, HiSIM, as a circuit design model of a semiconductor element; it is defined as a chromosome wherein respective great number of parameters of the circuit design model of the semiconductor element are genes; and said parameters is optimized by using a genetic algorithm based on property measured data of the tested semiconductor element.

Also, said parameter adjusting means includes a first portion parameter adjusting means adjusting the parameters which determine the structure of the semiconductor element based on the specific measured data of the semiconductor element belonging to a long channel group; and a second portion parameter adjusting means adjusting the parameters which require adjustment, except for the parameters adjusted by said first portion parameter adjusting means based on the specific measured data of various length of channels, with reference to the adjustment result of said first parameter adjusting means.

Effect of the Invention

According to the above-mentioned features, since a genetic algorithm is applied to parameter adjustment of a circuit design model of a semiconductor element based on surface potential which determines all transistor properties such as, for example, HiSIM and so on, a parameter adjusting device of the present invention has the effect to be able to perform the optimum parameter adjustment, which was conventionally difficult to do, within a short time and with a high degree of accuracy. Also, the parameter adjusting device has the effect to be able to additionally improve efficiency and accuracy of processing by dividing a parameter group into more than two groups; and adjusting the parameters in stages using specific measured data which is appropriate for the respective groups.

Figure 7:
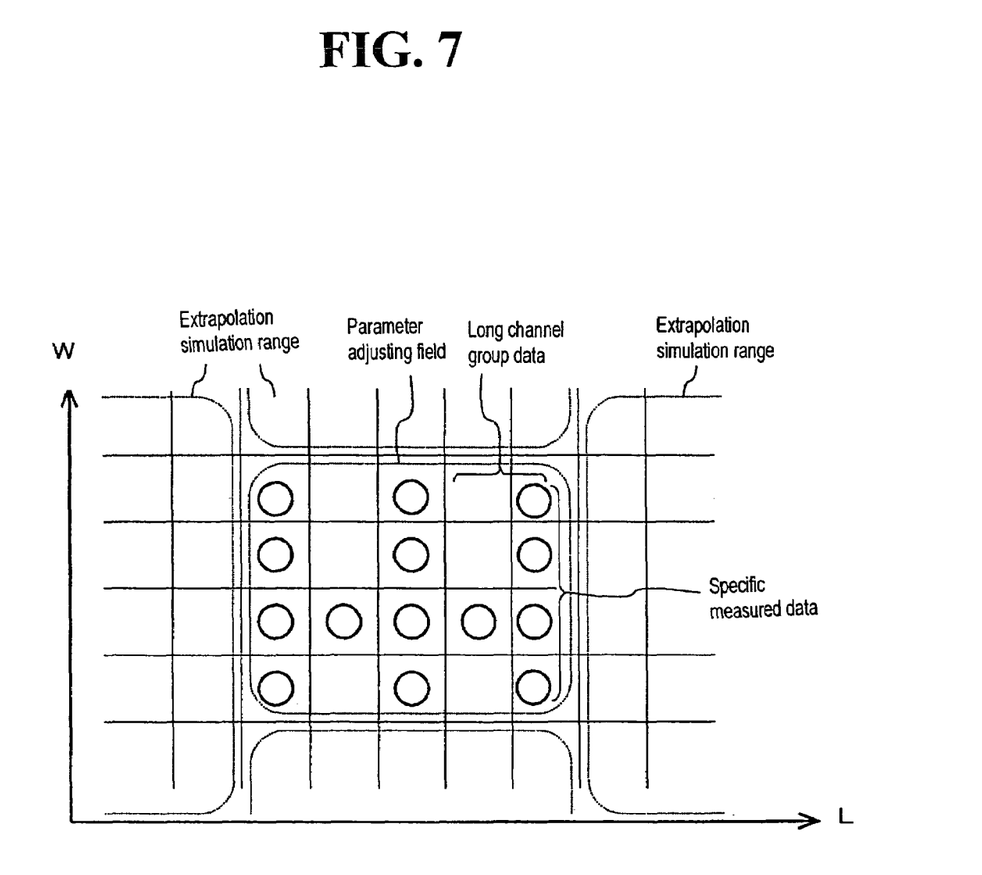
FIG. 7 is an explanatory drawing showing a selection method for the shape of a transistor being tested.

A parameter adjusting device has the effect to be able to perform a high-accuracy simulation even within the range of an extrapolated simulation as shown in FIG. 7, by adjusting a part of the parameters being adjusted in the previous stage according to need, as well as a parameter group which will be adjusted in the next stage.

| EXPLANATION OF SYMBOLS | |
|---|---|
| P0, P1, P2 | Parent gene vector |
| G | Center of gravity |

DETAILED DESCRIPTION OF PREFERRED EMBODIMENTS

A parameter adjusting device of the present invention can be realized by creating a program performing processing shown by a flowchart described hereinafter, and installing the above-mentioned program in the heretofore known optional computer system which can perform the program. Incidentally, since the hardware of the computer system is heretofore known, detailed explanations are omitted. Hereinafter, an embodiment 1 of the present invention will be explained.

Embodiment 1

Figure 1:
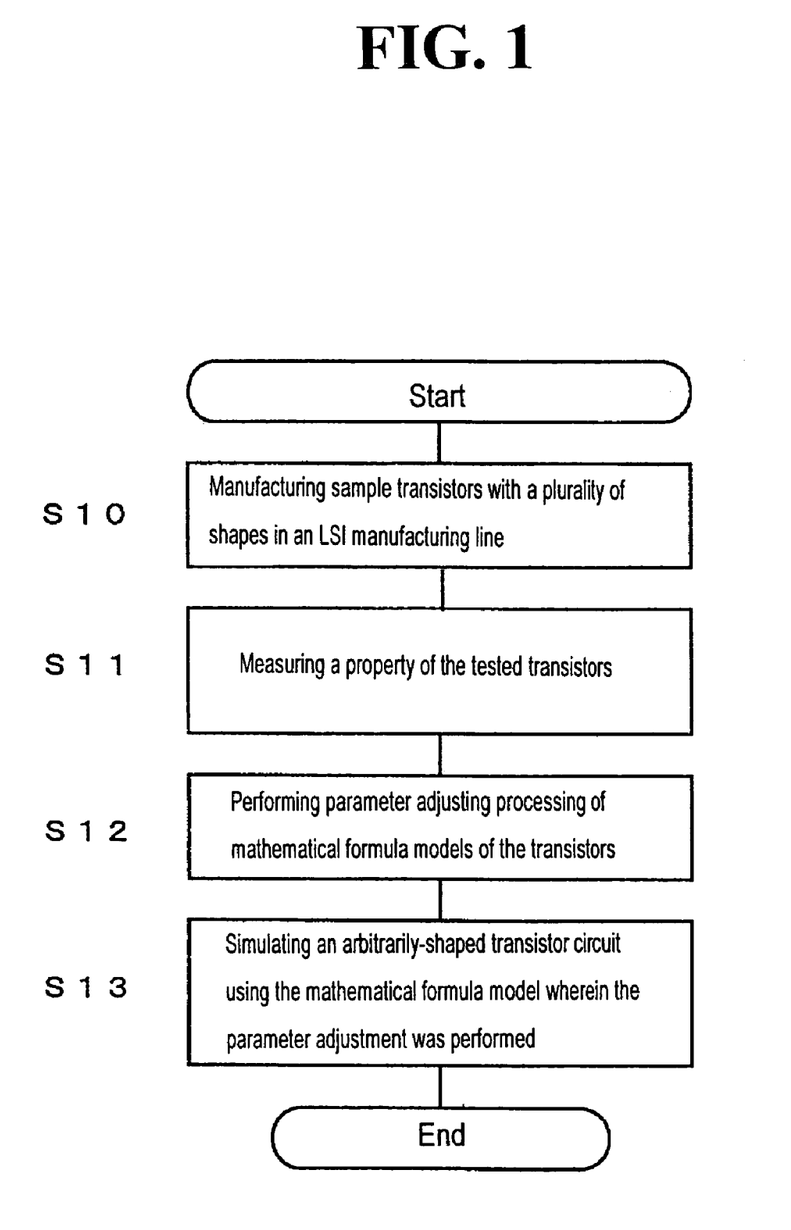
FIG. 1 is a flowchart showing entire procedures in the case wherein simulation is performed using a parameter adjusting device of the present invention.

FIG. 1 is a flowchart showing all the procedures in the case wherein simulation is performed using a parameter adjusting device of the present invention. As mentioned above, in the case of LSI manufacture, first, in S10, samples of several transistors (MOSFET) with a different shape (size) of a channel length L and channel width W and so on of a gate are tested in said LSI manufacturing line.

FIG. 7 is an explanatory drawing showing a selection method for the shape of a transistor being tested. The selection method for the shape divides, for example, between the maximum value and minimum value of L (channel length) and W (channel width) at even intervals; or divides on the side near the minimum value more minutely; and for example, as indicated with circle marks in FIG. 7, selects a great number of sections (shapes) of the transistor being tested on an L-W plane surface.

In S11, an electric property of the tested transistor is measured. Specifically, with respect to an IdVd property (Vb fixation), IdVd property (Vg fixation), and IdVg property (Vd fixation), respective great number of sample values (measured data) are measured a great number of times by changing fixed values.

In S12, the parameter adjusting processing of a circuit design model of a semiconductor is performed by a method described hereinafter using the parameter adjusting device of the present invention, in such a way as to match a property of the transistor which is manufactured in said manufacturing line with a high degree of accuracy.

In S13, operation simulation of a transistor with an optional channel length and channel width which is manufactured in said manufacturing line using the heretofore known circuit simulation program such as SPICE, is performed using the circuit design model wherein the parameters are adjusted.

In S12, the parameter adjusting device of the present invention adopts a surface potential model wherein a formula for analysis is derived based on surface potential such as, for example, HiSIM, as a circuit design model of a semiconductor element; it is defined as a chromosome wherein a respective great number of parameters of the circuit design model of the semiconductor element are genes; and the parameters are optimized by using a genetic algorithm based on property measured data of the tested semiconductor element.

In the HiSIM, the fundamental device property description is obtained by solving a basic equation of the semiconductor. This device property description is significantly accurate in a long-channel MOSFET. As the channel of the MOSFET becomes shorter, a complicated two-dimensional phenomenon becomes apparent. However, imperfection occurs when a device property is described by the formula for analysis and modeled, and this imperfection brings an error. Consequently, in order to cover the error in a short channel, or consider an effect wherein a manufactured transistor is not made at one's request, several model parameters are introduced in the HiSIM, and actual measurement value is described phenomenally.

The parameter of the portion which follows a device element design is a parameter determining a structure of the semiconductor element, and has a clear physical meaning and a clear contribution in the formula for analysis. The parameter also has a profound effect on a property without recourse to the length of the channel. On the other hand, the parameter which is introduced in order to cover the imperfectness of the model or transistor and reproduce an actually measured transistor property, does not have a significant effect on the property of the long channel.

Consequently, respective parameter accuracy is improved by dividing the parameter adjustment of the portion following the device element design, and adjustment of the model parameters introduced in order to cover the imperfectness of the model or transistor and reproduce the actually measured transistor property.

The parameter adjusting means includes, at first, a first portion parameter adjusting means (first step) adjusting a group of the parameters which has a profound effect on the property of each channel length and determines the structure of the semiconductor element based on the property measured data of a long channel group; and a second portion parameter adjusting means (second step) adjusting the other parameters which have a profound effect mainly only when the length of the channel is short based on the property measured data of various lengths of channels with reference to an adjustment result of the first parameter adjusting means. Incidentally, a part of the parameters which was adjusted in the previous stage according to need, may be adjusted in addition to a parameter group which will be adjusted in the next stage.

Figure 9:
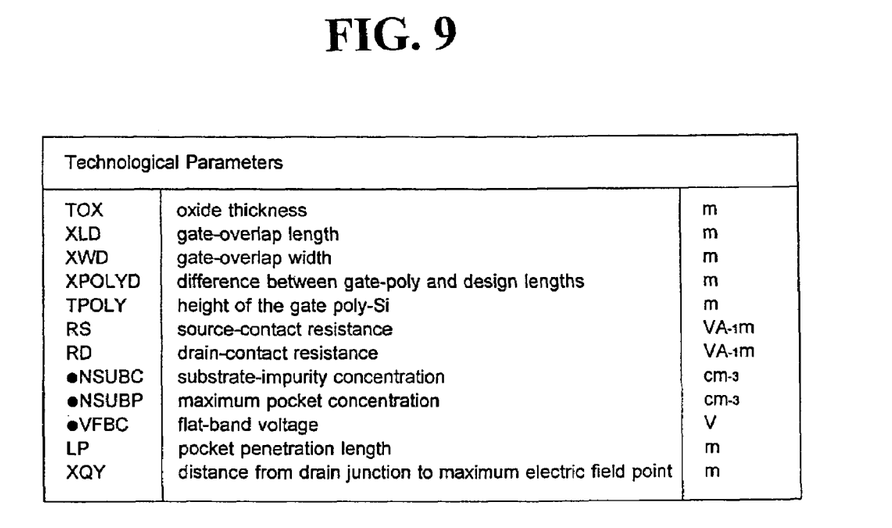
FIG. 9 is a list showing a technological parameter of MOSFET of HiSIM.

In the HiSIM, the parameters are divided into a great number of groups as described in said Japanese Nonpatent Publication. In the case of the MOSFET, as shown in FIG. 9, there are twelve parameters of TOX, XLD, XWD, XPOLYD, TPOLY, RS, RD, NSUBC, NSUBP, VFBC, LP, and XQY in a technological parameters group. These parameters determine the structure of the semiconductor element.

Figure 10:
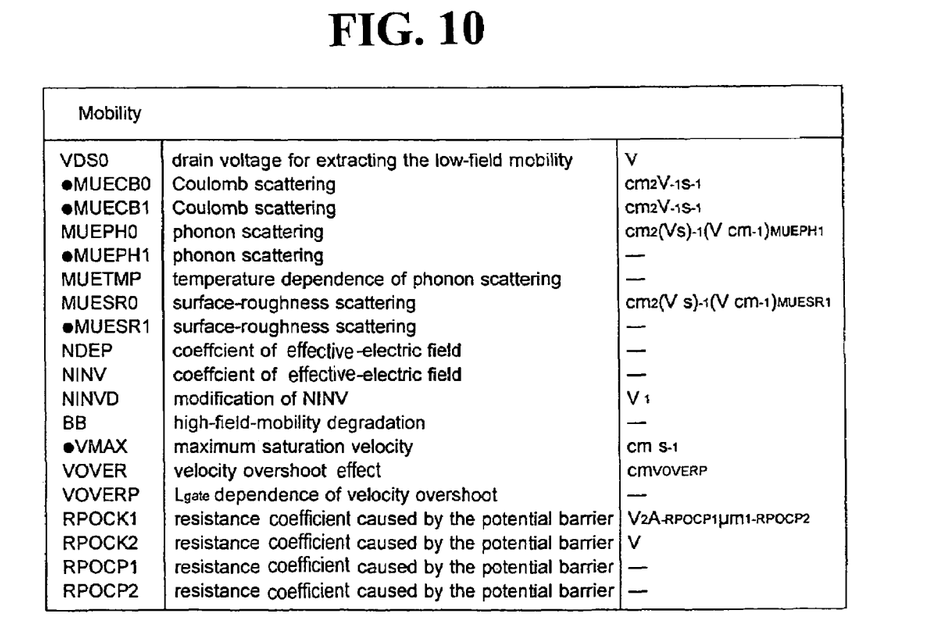
FIG. 10 is a list showing a mobility parameter of the MOSFET of the HiSIM.

Also, in a mobility parameter group, as shown in FIG. 10, there are nineteen parameters of VDS0, MUECB0, MUECB1, MUEPH0, MUEPH1, MUETMP, MUESR0, MUESR1, NDEP, NINV, NINVD, BB, VMAX, VOVER, VOVERP, RPOCK1, RPOCK2, RPOCP1, and RPOCP2.

Incidentally, among the above-mentioned parameters, there is a case wherein the structure of the semiconductor element is determined at the time of manufacturing, or wherein the structure of the semiconductor element becomes known by the measurement, so that the parameter adjustment is not required, for example, as the TOX (oxide film thickness). Also, there is a case wherein contents or the number of the parameters change depending on element types or circuit design model versions.

The inventors of the present invention focused on the following respects. The parameters requiring the adjustment are a parameter having a large effect on the property in the entire channel length and determining the structure of the semiconductor element; and a parameter for correcting a gap and so on between the model and actual property reside mainly in the case wherein the channel is short. The parameters are divided into a parameter wherein there is a large effect on the accuracy when the channel is short; and a parameter wherein there is little effect on the accuracy when the channel is long. Accordingly, the inventors of the present invention invented a parameter adjusting means which, at the first step, adjusts a parameter having a large effect on the property in each channel length; and as the second step, adjusts the remaining parameter using a result of the first step.

In an embodiment, as the first step, the parameter adjusting means is required to have a large effect on the property in each channel length and adjust the parameters. The parameter adjusting means adjusts a total of eight parameters (parameters marked by • in FIGS. 9, 10) of three parameters of the NSUBC, NSUBP, and VFBC of the technological parameter group; and five parameters of the MUECB0, MUECB1, MUEPH1, MUESR1, and VMAX of the mobility parameter group, which determine the structure of the semiconductor element. In connection with the other parameters which are required, the adjustment, recommended value as described in, for example, said Japanese Nonpatent Publication, is configured.

Incidentally, the five parameters of said mobility parameter group are not the parameters determining the structure of the semiconductor element. The five parameters are parameters determined by the determination of the technological parameters, and these parameters are also adjusted in the first step.

Figure 2:
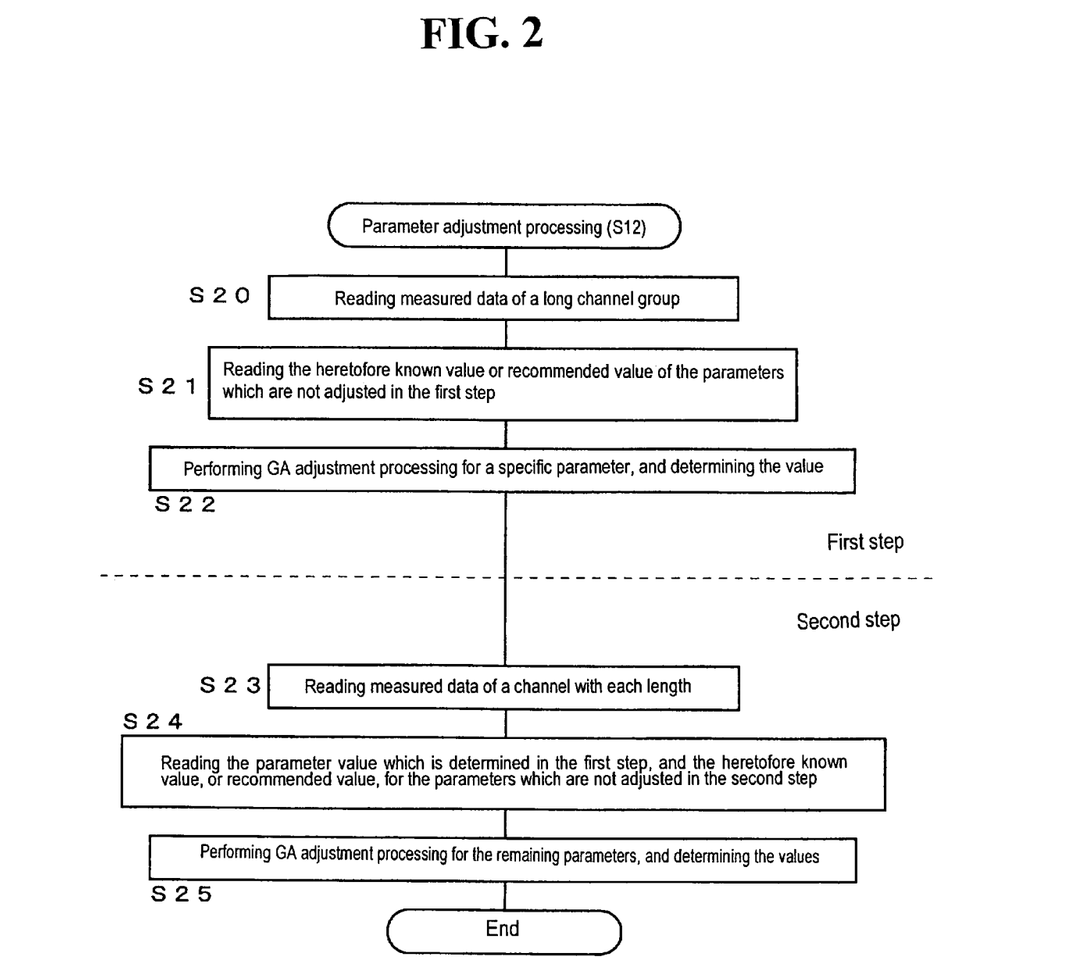
FIG. 2 is a schematic flowchart showing the contents of a parameter adjusting processing of the present invention.

FIG. 2 is a schematic flowchart showing the contents of a parameter adjusting (fitting) processing of the present invention. First, in S20 of the first step, several types of the measured data of the group wherein the channel length L is longer, are read. The reason why the measured data of the long channel group with the channel length L is used, is that, since parameters which are adjusted in the second step are still unadjusted, the accuracy of the parameters which are adjusted in the first step is evaluated by long channel data wherein the parameters adjusted in the second step have a few effects. Accordingly, the accuracy of the parameters adjusted in the first step can be improved.

In S21, the heretofore known value such as the fixed value, measurement value and so on, and for example, the recommended value as described in said Japanese Nonpatent Publication, are read in the parameters which are not adjusted in the first step, i.e., nonadjusted parameters, and the parameters which are adjusted in the second step. In S22, with respect to said eight specified parameters, GA (genetic algorithm) adjusting processing is performed, and the value is determined. This is the first step.

In S23 which is the second step, measured data of each channel length is read. In S24, the heretofore known value such as the fixed value, measurement value and so on, and the recommended value, and the parameter value which was determined in the first step, are read in the parameters which are not adjusted in the second step. In S25, the GA adjustment processing is performed for the remaining parameters, and the value is determined. Incidentally, the parameters adjusted in the first step may be adjusted once again in the second step. In this case, an adjustable range of the parameters may be limited to be close to the value adjusted in the first step.

The reason why the measured data of each channel length is used is as follows. In the second step, parameters which have a large effect are adjusted mainly only in the short channel. However, if only measured data of the short channel is used, the accuracy in the field of the long channel deteriorates. Consequently, in the second step, high-accuracy parameters can be obtained in all fields by using even the measured data of the long channel. Incidentally, in the processing of the S25, types or numbers of the parameters, or numbers of chromosomes being generated and so on differ. However, the algorithm itself of the GA is the same as the processing of the S22.

Figure 3:
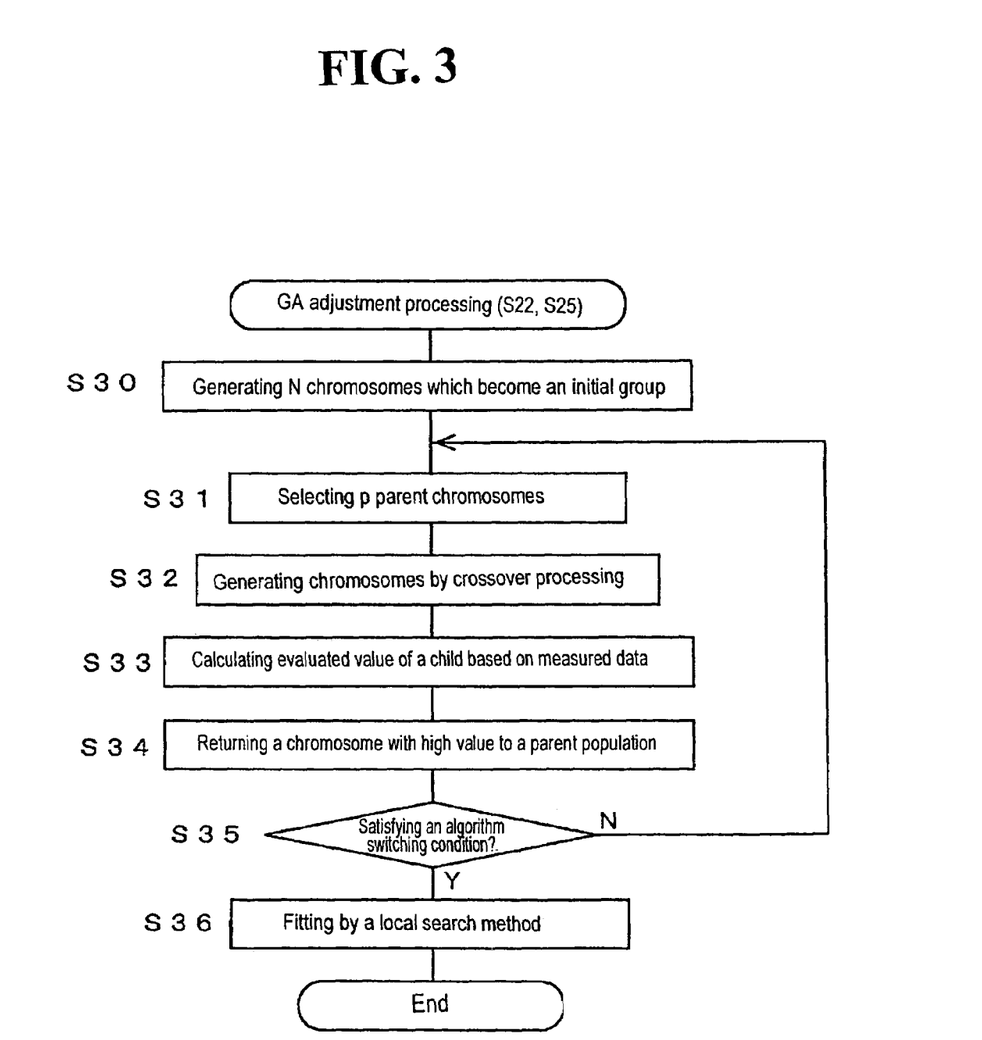
FIG. 3 is a schematic flowchart showing the parameter adjusting processing using GA.

FIG. 3 is a schematic flowchart showing the parameter adjusting (fitting) processing using the GA of the S22 and S25. In S30, a measured data group which will be used, is read, and N chromosomes, wherein the parameter which ought to be adjusted of a circuit design model function of the transistor are the genes, are generated, and are considered as an individual population. An individual generation determines the value of the genes in the chromosomes, and calculates evaluated value of the chromosomes.

In the embodiment, parameters such as the N chromosomes in the genetic algorithm or c child generations and so on are allowed to change depending on n parameters which ought to be adjusted. As a result, if the n is small, the processing becomes fast. In the embodiment, for example, the N chromosomes=n×15. Also, in the HiSIM, a range of recommended parameter initial values is set, so that in each parameter, the initial value is determined randomly within the range of the recommended parameter initial value, and becomes the value of the genes.

At this time, for parameters on a range of an exponential search, the value of the gene may be represented as a logarithm of the parameter value, and the value of the gene may be determined by the logarithm. The range of the exponential search indicates a search range wherein there is a great difference of digit numbers between the lower limit and upper limit such as [10E-25 10E-9].

Incidentally, in the case that it is apparent beforehand that a range which is narrower than the recommended range of the parameters is preferred, the initial values may be limited to the narrower range. For example, in the case that a threshold voltage (Vth) of the transistor is identified by the measurement, existing ranges of various types of parameters can be estimated based on the above-mentioned value. Search time (time required for convergence) of the genetic algorithm can be saved significantly by limiting the range of the parameter initial value of the genetic algorithm to the above-mentioned existing range.

In S31, p chromosomes which become parent individuals are randomly selected from individual populations generated in the S30. In the case that n parameters are adjusted, the value of p is preferably p=n+j. The reference alphabet j represents positive constants of 1~3. In S32, the center of gravity G of p parent individuals which were selected in the S31, is obtained. More specifically, average value is obtained at each parameter.

In the S32, child individuals with the number of child are generated from the selected parent individuals by the crossover processing described hereinafter. In S33, the evaluated value of the child individual being generated at the S32 is calculated by the means described hereinafter. Incidentally, the evaluated value of the parent individuals is already calculated. In S34, the p number of individuals which are retrieved from the parent individuals being selected in the S31 and the generated child individuals at the S32 in order of highest value is returned to an individual parent population, and the rest is abandoned. Due to this processing, a low-valued chromosome is eliminated. Incidentally, in addition to this, the following method in which: a part of the parent individuals is returned to the parent population as it is without being selected as the object of the selection and the number of "the rest of the parent individual" is returned in the order of the highest value from the rest of the parent individuals and the child individuals.

In S35, whether or not an algorithm switching condition is satisfied is determined. If the condition is not satisfied, the individuals return to the S31. However, if the condition is satisfied, the individuals move to S36. The switching condition is whether or not: the iteration of calculation (generation number) has surpassed the predetermined value; or the reduction rate (the case wherein the smaller the value, the greater the evaluation) of the evaluated value has become below the predetermined value, and so on. In S47, as a local search method, the parameter adjustment is performed by, for example, the heretofore known Powell method, or the other heretofore known local search method. Herewith, in the final stage of the search, the parameter adjusting time can be reduced much further by switching the search method from the GA to the local search method.

Next, the crossover processing of the present invention will be explained. As a conventional crossover method, a processing wherein a bit of a gene of a chromosome is partially switched, was used. This crossover method is an effective method when the gene is a bit value (0 or 1). However, the crossover method is not necessarily the effective method when the gene is a real number value. Consequently, the following crossover method for the real number value is used.

Figure 4:
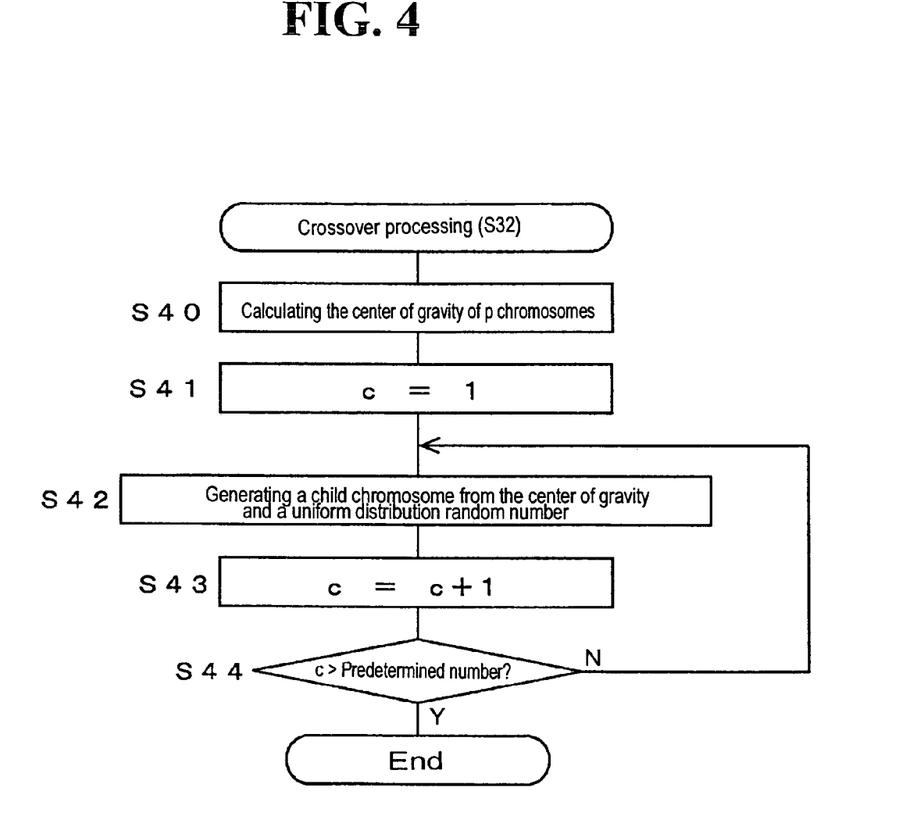
FIG. 4 is a flowchart showing the contents of crossover processing of S32.
Figure 5:
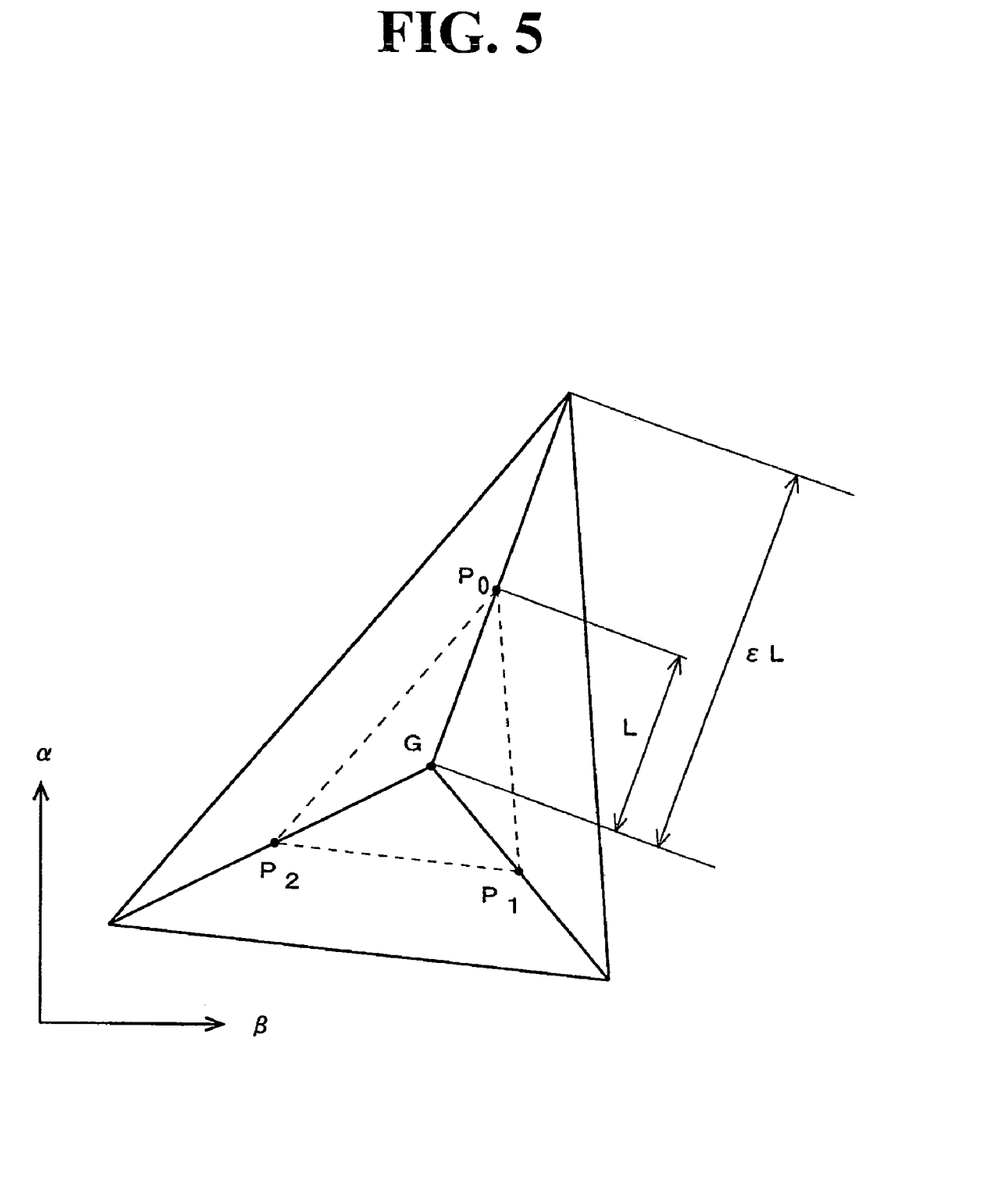
FIG. 5 is an explanatory drawing showing a crossover method of the present invention.

FIG. 4 is a flowchart showing the contents of the crossover processing of the S32. The crossover method is a crossover method for the real number value which generates the genes of the child individuals from a polyhedron calculated from the genes of a great number of parent individuals. Also, FIG. 5 is an explanatory drawing showing the crossover method of the present invention. In S40, the center of gravity of the p chromosomes is calculated. In S41, the value of a variable c is set 1, and in S42, one child individual is generated by the following numerical formula 1 wherein the center of gravity G and uniform distribution random numbers are used.

$$C = x_{p-1} + C_{p-1}$$ [Numeral 1]

$$x_k = G + \varepsilon(P_k - G)$$

$$C_k = \begin{cases} 0 \ (k = 0) \\ r_{k-1}(x_{k-1} - x_k + C_{k-1}) \ (k = 1, \ldots, p-1) \end{cases}$$

$$r_k = (u(0, 1)^{1/(k+1)})$$

Here, the reference alphabet p represents the number of the selected parent individuals, the reference alphabet C represents a vector showing the chromosomes of the child individuals which will be generated, and the reference alphabet Pk represents a vector showing the chromosomes of the selected parent individuals. Incidentally, in the present embodiment, the number of the selected parent individuals is n+2. Also, u(0, 1) is the uniform distribution random number of an interval [0, 1].

In S43, 1 is added to the variable c, and in S44, whether or not the variable c is larger than a predetermined number Child is determined. If a determined result is negative, the parameters return to the S34, and if the result is positive, the crossover processing is completed. Due to the processing, the child individuals with the number of Child are generated. The number of the Child is desirable to be approximately 10×n.

FIG. 5 is an explanatory drawing showing the search range (generating range of the child individuals) of a simplex crossover when the adjusted parameters is two of α and β, and the number of the parent individuals randomly selected from the parent population is three. A vector (L) from the center of gravity G to each parent individual P0~P2 is increased c times, the generating range (inside of an outside triangle in FIG. 4) of the child individual is determined, and by using the uniform random numbers from the above-mentioned range, the child individuals are generated. When the number of the parent individuals is p, the recommended value of $\varepsilon$ is $\sqrt{(p+1)}$. Incidentally, when the number of the parameters is three or more, the generating range of the child individuals is an internal space of a hyperpolyhedron surrounded by a great number of hyperplanes.

By using the above-mentioned crossover method, the parameters can be treated positively toward the question wherein parameters of an adjusting target is a real number value, and an effective adjustment can be performed. Being able to be treated positively means that the individuals near the parameter space are also located near the gene space. Also, the above-mentioned crossover method is very strong for dependency between variables, and does not depend on how to take a scale. The crossover method is suitable for the parameter adjustment of the circuit design model function of the semiconductor element which is focused on a surface potential such as the HiSIM, which has strong dependency between parameters and there are great number of parameters with different scaling.

Generally, in the genetic algorithm, a mutation method is applied in addition to the crossover method. The mutation method carries out an operation which reverses the bit value of a part of the genes of the chromosomes in the case of the genetic algorithm operating a conventional discrete binary number value. Also, even in the case of the genetic algorithm operating a real number value, the operation wherein normal random numbers being generated according to a normal distribution N (0, $_o$ 2) are added to each gene of the chromosomes, is proposed; however since the above-mentioned crossover method of the present invention uses the random numbers in the process of the crossover processing, the crossover method also includes the property of a mutation. Therefore, when the above-mentioned crossover method is used, a mutation processing is not applied.

Next, the evaluated value calculated in the S33 will be explained. The evaluated value of the chromosomes is calculated based on an error between the measured data of the tested elements and specific data which is calculated at the HiSIM wherein the genes of the chromosomes are the model parameters. The evaluated value is determined by referring to both evaluated values in a log (logarithm) scale and linear scale.

Figure 8:
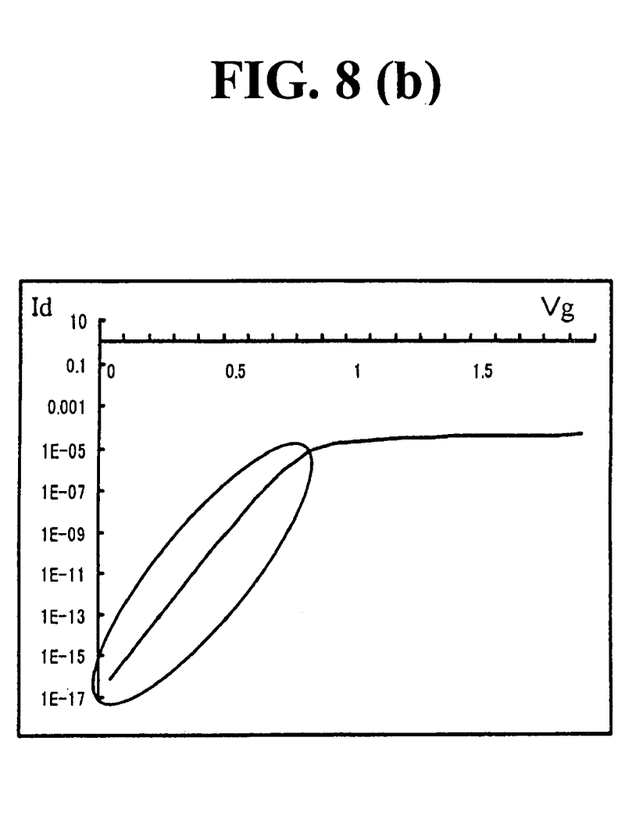
FIGS. 8(a) and 8(b) are graphs of a linear scale and log scale showing the IdVg property of a transistor.

FIGS. 8(a), 8(b) are graphs of a linear scale (a) and log (logarithm) scale (b) showing the IdVg property of a transistor. As shown in portions circled by an ellipse in FIGS. 8(a), 8(b), there is a portion showing a substantial change of values in the measured data, when the graph is viewed with the log scale as shown in FIG. 8(b); although the values look like approximately 0 when the graph is viewed with the linear scale as shown in FIG. 8(a). The above-mentioned quality is called a sub-threshold property.

Since the absolute value of the above-mentioned portion is small compared to the other part, the absolute value of an error is also small, so that it is difficult to optimize this portion by using only the data of an usual linear scale. Also, in order to adjust this portion, if only a data group of the log scale is prepared and optimized, the sub-threshold property can be optimized; however, an error in the other part except for the above-mentioned portion becomes large, and a gap is developed.

Consequently, in the present invention, a data group of the log scale and a data group of the linear scale are read simultaneously by the following scaling processing, and all the properties are adjusted simultaneously.

Incidentally, in the case wherein the scaling differs between the measured data, if error of mean square is taken, an effect on the evaluated value becomes small in the data group with a small scale. Therefore, the accuracy of the adjustment may be deteriorated even if the above-mentioned scaling processing is performed. Consequently, in the present invention, each measured data is normalized, and the adjustment accuracy can be improved by unifying the scale.

Figure 6:
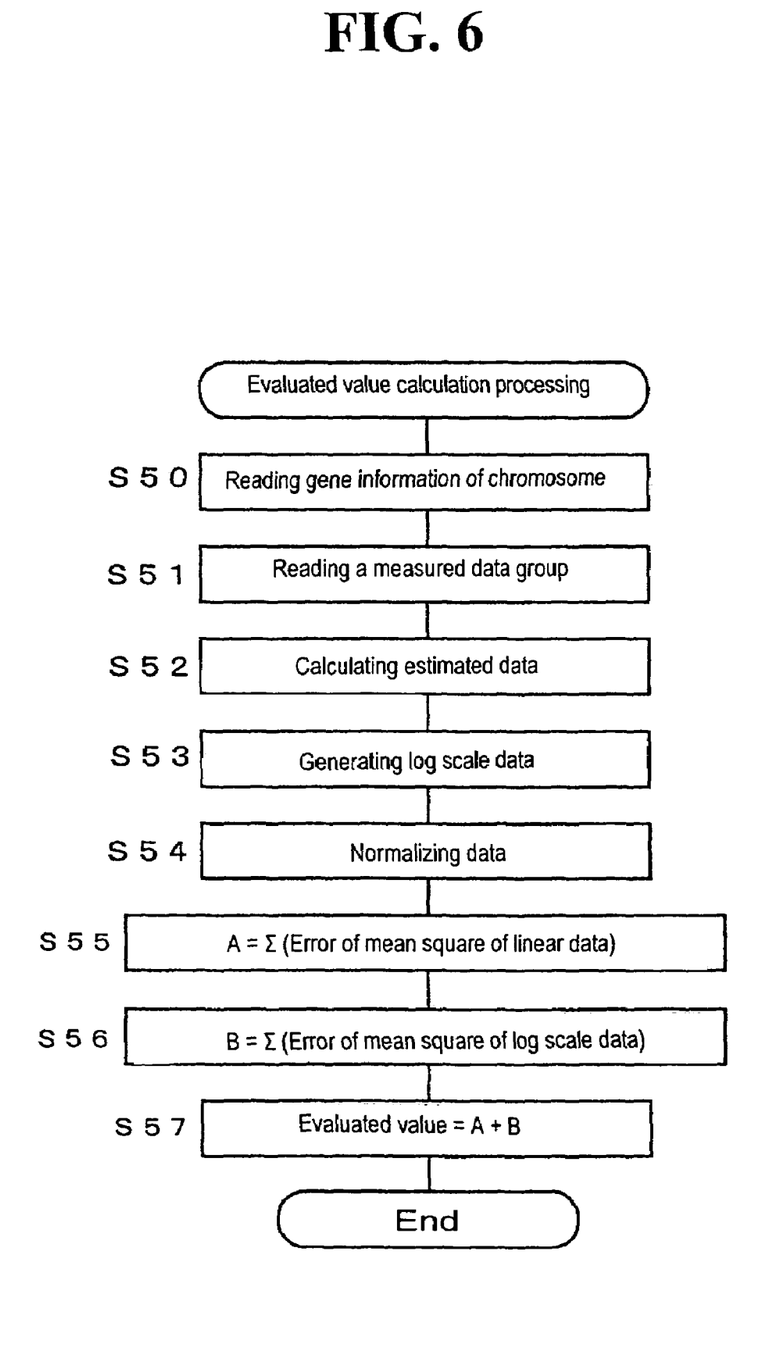
FIG. 6 is a flowchart showing an example of evaluated value calculation of S33.

FIG. 6 is a flowchart showing an example of evaluated value calculation wherein the above-mentioned scaling and a measured-data normalization technique are mounted in the S33. In S50, gene information of the chromosomes is read, and becomes the model parameter of the HiSIM. In S51, a measured data group is read. In S52, estimated data of a property corresponding to estimated data is calculated based on the model parameter input in the S50.

In S53, log scale data wherein an estimated data group and an estimated data group corresponding to the former estimated data group are converted into a log scale, is generated. In S54, the following data is converted. More specifically, first, the maximum value fmax and minimum value fmin of data groups are obtained. Next, all measured data f(i) of the data groups is converted into normalization data g(i) by the following numerical formula 2.

$$g(i)=(f(i)-f_{min})/(f_{max}-f_{min})$$ [Numeral 2]

Here, g(i) represents the normalization data; f(i) represents the measured data; fmax represents the maximum value of the data groups; and fmin represents the minimum value of the data groups. Due to the above-mentioned calculation, the measured data can be normalized within the range of [0, 1].

In S55, evaluated value A of only the data group of the linear scale is calculated. The reference alphabet A represents a total of error of mean square between normalization measured data and normalization estimated data. In S56, the evaluated value B of only the data group of the log scale is calculated. The reference alphabet B represents a total of error of means square between normalization logarithm measured data and normalization logarithm estimated data. In S57, A+B is the estimated value of the chromosomes. Incidentally, although the square error is used for calculating the estimated value, an error rate may be obtained instead of the square error.

By the above-mentioned processing, high-accuracy parameter adjustment can be performed within a short time. By adopting the relevant parameters to the circuit design model, a high-accuracy element/circuit simulation including extrapolation can be performed without a test, so that efficiency in manufacturing a semiconductor device improves.

Embodiment 1 is explained in the above; however, the following transformational example is used as the parameter adjusting device of the present invention. Although the HiSIM is cited as an example of a circuit design model of a transistor, there are SP2000, MOS Model 11, PSP and so on besides the HiSIM, as the circuit design model of a semiconductor based on the surface potential. Also, in the HiSIM, an electric charge is calculated based on the surface potential, and a property of an element is calculated by the electric charge. On the other hand, there is also a circuit design model which describes the property of the element by directly starting from the electric charge. As an example of this kind of model, for example, there is an EKV model of the Switzerland Institute of Technology. Even in the case of the EKV model, a parameter group corresponding to a technological parameter group of the HiSIM can be defined, so that the present invention can be applied to the EKV model as in the case of the HiSIM.

What is claimed is:

1. A parameter adjusting device adopting HiSIM (Hiroshima-university STARC IGFET Model), which is a surface potential model wherein a formula for analysis is derived based on surface potential as a circuit design model of a semiconductor element; defining a chromosome with genes as a respective great number of parameters of the circuit design model of the semiconductor element; and optimizing said parameters using a genetic algorithm based on property measured data of the tested semiconductor element, comprising:

first portion parameter adjusting means for at least adjusting
a part of the parameters in a technological parameter group in the HiSIM which is the parameters determining the structure of the semiconductor element using the genetic algorithm based on the property measured data of the semiconductor element belonging to a long channel group, and
a part of the parameters in a mobility parameter group which is determined by the determination of a part of the parameters in the technological parameter group; and second portion parameter adjusting means for adjusting a part of the parameters adjusted by the first portion parameter adjusting means and the parameters which require adjustment, excepting the parameters being adjusted by said first portion parameter adjusting means using the genetic algorithm based on the property measured data of various length of channels, with reference to an adjustment result of said first parameter adjusting means, and said first and second portion parameter adjusting means, comprising child chromosome gene determination means for obtaining the center of gravity in a vector space of a parent chromosome group, in crossover processing of the genetic algorithm, and determining genes of a child chromosome inside a hyperpolyhedron in the vector space which is determined by values of said center of gravity and the parent chromosome group.

2. A parameter adjusting device according to claim 1, wherein said child chromosome gene determination means generates the genes of the child chromosome inside the hyperpolyhedron in the vector space which is determined by the values of said center of gravity and the parent chromosome group by the following equation $$C = x_p + C_p \qquad \text{[Equation 1]}$$
$$x_k = G + \varepsilon(P_k - G)$$
$$C_k = \begin{cases} 0 & (k = 0) \\ r_{k-1}(x_{k-1} - x_k + C_{k-1}) & (k = 1 \ldots p) \end{cases}$$
$$r_k = (u(0, 1)^{1/k+1})$$

wherein C represents the center of gravity of selected p parent individuals, C represents a vector showing the chromosomes of the child individuals which will be generated, and Pk represents a vector showing the chromosomes of the selected parent individuals and wherein u(0, 1) is a uniform distribution random number of an interval [0, 1].

3. A parameter adjusting device according to claim 1, wherein said portion parameter adjusting means comprises:
evaluated value calculation means obtaining both the first evaluated value based on the data of a linear scale and the second evaluated value based on the data of a log scale, in selection processing of the genetic algorithm, and determining a total of the first evaluated value and the second evaluated value as the evaluated value of said chromosomes; and
normalization means unifying a scale of the data.

4. A computer-readable medium wherein a program for operating a computer as the parameter adjusting device according to claim 1 is stored.

5. A parameter adjusting method adopting HiSIM (Hiroshima-university STARC IGFET Model), which is a surface potential model wherein a formula for analysis is derived based on the surface potential as a circuit design model of a semiconductor element; defining a chromosome with genes as a respective great number of parameters of the circuit design model of the semiconductor element; and optimizing said parameters using the genetic algorithm based on property measured data of a tested semiconductor element, comprising:
a first step of adjusting using a computer system a part of the parameters in a technological parameter group in the HiSIM which is the parameters at least determining a structure of the semiconductor element based on the property measured data of the semiconductor element belonging to a long channel group, and a part of the parameters in a mobility parameter group which is determined by the determination of a part of the parameters in said technological parameter group; and
a second step of adjusting a part of the parameters adjusted in said first step, and parameters which are required to be adjusted, excepting the parameters adjusted in said first step, using the genetic algorithm, based on the property measured data of various length of channels, with reference to an adjustment result of said first step.

* * * * *